Sept. 14, 1954   F. A. GOOD, JR., ET AL   2,688,761
AIRCRAFT LOADING AND UNLOADING BRIDGE
Filed July 31, 1950   8 Sheets-Sheet 1

INVENTORS
LYLE R. HACKNEY
FREDERICK A. GOOD JR.
By *George C. Sullivan*
Agent Patented Sept. 14, 1954

2,688,761

UNITED STATES PATENT OFFICE 2,688,761

AIRCRAFT LOADING AND UNLOADING BRIDGE

Frederick A. Good, Jr., North Hollywood, and Lyle R. Hackney, Burbank, Calif., assignors, by mesne assignments, to Lockheed Aircraft Corporation, Burbank, Calif., a corporation of California Application July 31, 1950, Serial No. 176,824

2 Claims. (Cl. 14—71)

This invention relates to passenger and cargo handling equipment and relates more particularly to a bridge device for facilitating the loading and unloading of aircraft.

It is an object of the present invention to provide a mobile and versatile means whereby passengers, commissary supplies and/or air freight may be conveniently and expeditiously moved into and out of aircraft, taxied to positions adjacent the dock of an aircraft terminal building or the like. The bridge means of the invention is such that the passengers may transfer and/or cargo may be quickly moved into and out of an airplane on power driven or manually manipulated carts or conveyances and is such that the passengers and conveyances can readily move into and out of aircraft of different types and sizes located in various positions with respect to the dock.

Another object of the invention is to provide an aircraft bridge that is capable of being moved or translated along the dock, swung to any required angle with respect to the dock, extended or contracted in length and raised or lowered from its outer end to be brought into the passenger and cargo handling positions at aircraft of various types spotted or taxied to different locations with respect to the dock. The several optional adjustments or motions of the bridge and its ability to be moved along the dock and swung to practically any required angle, make it practical to quickly position the outer extremity of the bridge at the passenger or cargo door of an airplane taxiied or moved into any reasonable position near the dock and permit the bridge to be moved from one loading area to another to reduce the passenger and cargo handling equipment required at a given dock or terminal.

Another object of the invention is to provide an aircraft loading bridge of this character that is self-powered to be readily moved along the dock and adjusted as required. In practice the bridge may be operated by self contained hydraulic motors, electric motors, or the like, to be translated along the dock, swung or pivoted relative to the dock and elevated or lowered from its outer end to be quickly repositioned or arranged for use in given loading or unloading operations.

Another object of the invention is to provide a loading bridge of the class described in which the various operating mechanisms are controlled from a single station adjacent the outer end of the primary bridge span, giving the operator full control over the device.

A further object of the invention is to provide a loading bridge embodying a main span supported at its inner end adjacent the dock by a wheeled inner tower for movement along the dock and for angular movement in both vertical and horizontal planes and supported at its outer end by a wheeled self-powered tower which incorporates novel means for raising and lowering the outer end of the main span, which means is automatically and instantaneously operable to lock the span at any selected elevation, the inner tower may or may not be self propelled, as desired.

A still further object of the invention is to provide a loading bridge of this kind incorporating a protective weather canopy for the main bridge span and its outer extension, the extension being adapted for full or partial retraction to give full visibility to the operator at the control panel, to provide clearance or freedom of movement of the airplane empennage past the bridge structure, etc.

Other objectives and features of the invention will become apparent from the following detailed description throughout which reference will be made to the accompanying drawings in which.

In the drawings we have illustrated a portion of an elevated dock 10 and an airplane 11 spaced in front of the dock. The dock 10 is elevated from the surface of the ground, ramp, or field, which may be considered to be paved in accordance with the usual practice at airports, etc. The face of the particular dock 10 illustrated is vertical and its upper surface is generally horizontal. The dock 10 may constitute a portion of an air terminal building or of a passenger and freight terminal structure and is preferably raised several feet above the field level. The particular typical airplane illustrated has a door or entrance 12 in its fuselage portion, the entrance being at a considerable distance above the ground.

The apparatus of the invention, which is intended to facilitate the loading and unloading of the aircraft at the dock 10 may be said to comprise generally a main span 14, a bridge section 15 extendible from the outer end of the span 14, canopy means 21 for the span 14 and section 15, a tower 16 adjacent the dock 10 supporting the inner end of the bridge span 14 for movement along the dock 10, for movement about a generally vertical axis and for movement about a generally horizontal axis, an outer supporting tower 17 for the main bridge span 14 having power driven and steerable wheels 18 and 19 whereby the span 14 may be swung about said vertical axis, a power actuated jack for raising and lowering the span 14 about said horizontal axis and other features and mechanisms, the details of which will be hereinafter described.

The main span 14 is in the nature of a mobile and adjustable ramp or gangway over which passengers, cargo carrying conveyances, conveyors, etc. may move. The bridge span 14 may be varied considerably in construction without departing from the invention. In the particular construction illustrated the span 14 includes a floor or decking 22, side trussing 23 and side and central longitudinal beams 24 below the decking. The span may also include suitable bracing 25 below the decking. The inner end of the span 14, that is the inner end of the span decking 22, is adjacent the upper surface of the dock 10 and the invention provides a dock board 26 for extending across the gap between the decking and the dock. This dock board 26 is hinged to the end of the decking structure at 27 to extend inwardly onto the surface of the dock 10. The hinge 27 is such that the board 26 may lie substantially flush with the dock with the bridge span 14 in various raised and lowered positions. Furthermore, the dock board 26 is flared and proportioned to remain in contact with the upper surface of the dock 10 when the span 14 is swung about a vertical axis to various angular positions relative to the dock as well as when it is substantially parallel with the face of the dock. The hinge 27 is constructed so that there is a minimum of discontinuity between the surfaces of the docking 22 and board 26 to permit wheeled conveyances to be readily moved onto and from the span.

Figures 2, 3:
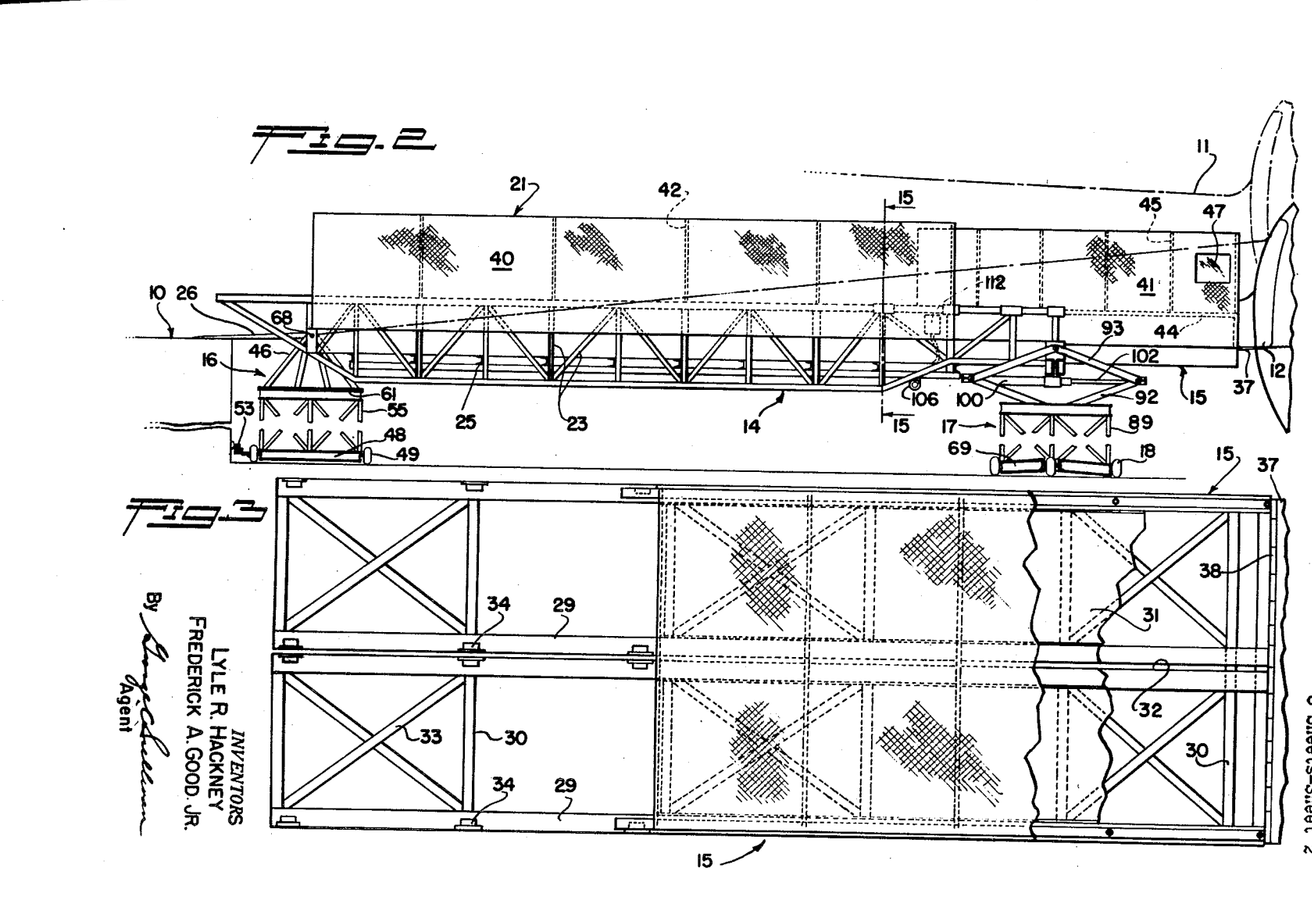
Figure 2 is an enlarged side elevation of the bridge.
Figure 3 is an enlarged plan view of the extensible section of the bridge.
Figure 11:
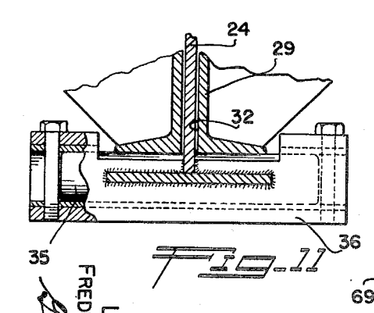
Figure 11 is an enlarged fragmentary vertical sectional view illustrating one of the roller means for supporting the extensible bridge section.
Figure 12:
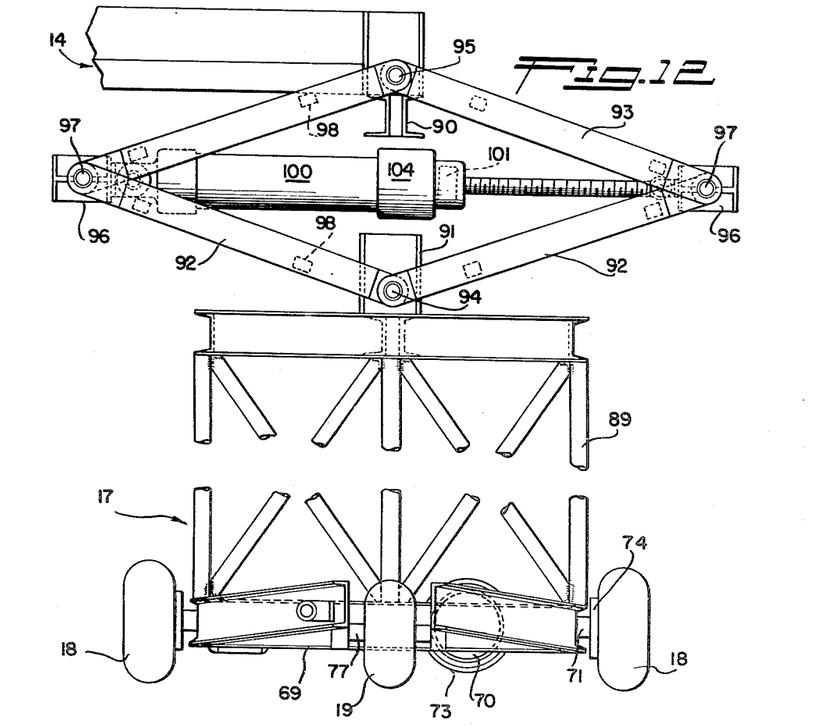
Figure 12 is an end elevation of the outer tower assembly illustrating the jack means and its connection with the main bridge span.
Figures 14, 15:
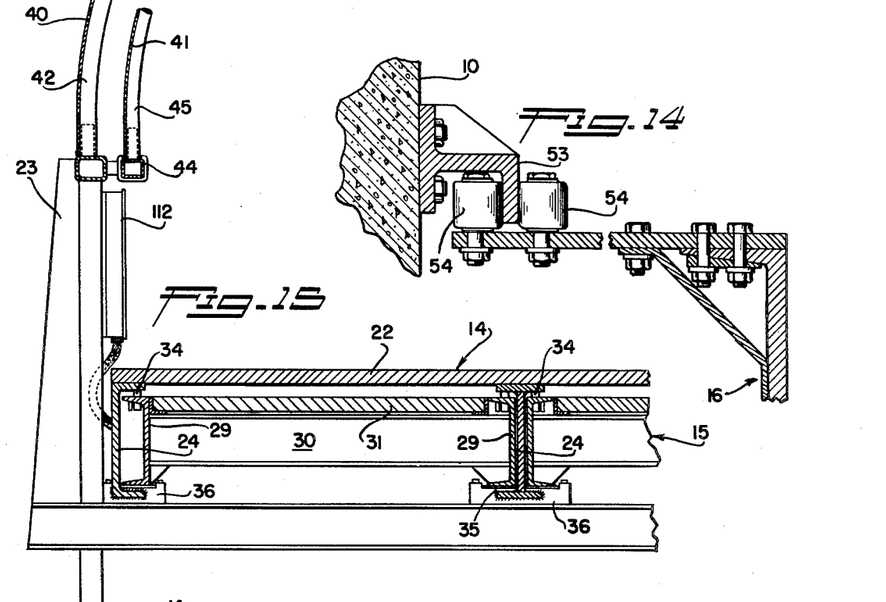
Figure 14 is an enlarged fragmentary vertical sectional view of another means for guiding the inner tower.
Figure 15 is an enlarged fragmentary vertical sectional view taken substantially as indicated by line 15—15 on Figure 2 and illustrating the means for mounting the extensible bridge section on the main bridge span.
Figure 16:
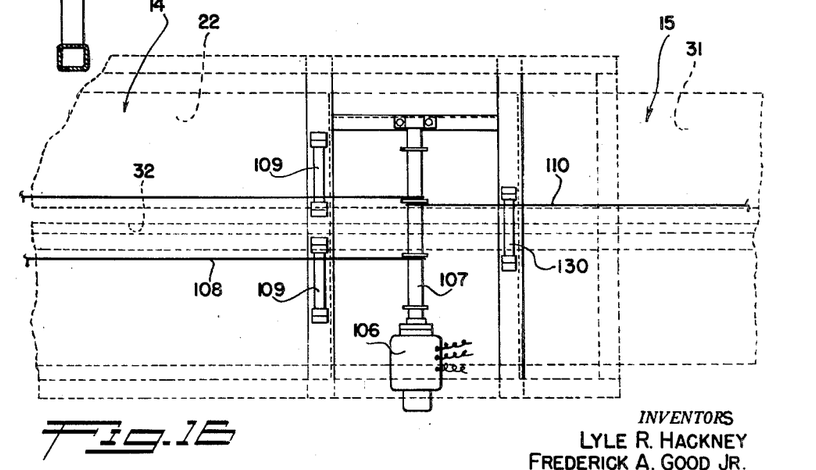
Figure 16 is a more or less schematic view of the underside of the bridge assembly illustrating the means for extending and retracting the outer bridge section with the main span and bridge section appearing in broken lines.

The bridge section 15 is in the nature of an extension at the outer end of the bridge span 14 and in accordance with the invention the section 15 may be extended greater or lesser distances from the outer end of the span 14 as conditions of use of the apparatus may dictate. The section 15 telescopes into the end of the main span 14 and is adapted to extend therefrom to constitute a cantilever element of the bridge structure. The section 15 is an elongate assembly comprising two pairs of spaced longitudinally extending beams 29. The inner beams 29 of these two pairs are spaced apart a sufficient distance to receive the central longitudinal beam 24 of the main bridge span 14, these inner beams 29 passing at opposite sides of the central beam 24 as illustrated in Figures 11 and 15. Transverse members 30 extend between the beams 29 and decking 31 rests on and is secured to the members. It will be observed that with this construction there is a central longitudinal gap or slot 32 in the section 15 for receiving the vertical web of the central beam 24 so that the section 15 may telescope under the decking 22 of the main span 14. The transverse members 30 secure the several beams 29 together at the outer end of the extensible section 15 and the section may be appropriately reinforced by diagonal bracing 33. Spaced rollers 34 are rotatably mounted on the beams 29 at the inner region of the section 15 and extend through openings in the beams to ride on the undersides of the top flanges of the main span beams 24. Rollers 35 are rotatably mounted in spaced pairs of tubular cages 36 fixed to the beam 24 on the main span 14 and have exposed portions riding on the lower flanges or sides of the beams 29 of the section 15. This construction, which is illustrated in Figures 3, 11 and 15, supports the section 15 for free telescoping or longitudinal adjustment relative to the main span 14. In practice, the section 15 may be quite long to materially increase the length of the bridge structure when extended and, of course, retains its telescopic engagement in the main span 14 even when in the fully extended position. It is to be observed that the decking 31 of the section 15 lies in substantially the same plane as the decking 22 of the main span 14 so that there is only a slight discontinuity between the two deckings.

The extensible bridge section 15 is adapted to be arranged with its outer extremity at the door or entrance 12 of the aircraft 11 and a dock board 37 is provided at the end of the section to facilitate the movement of conveyances, passengers, and personnel into and out of the airplane. The dock board 37 may be hinged to the end of the section 15 so as to accommodate relative vertical movement between the airplane 11 and the section 15 and to readily conform to or rest on the sill of the doorway 12. The hinged mounting or connection 38 of the dock board 37 with the section 15 may be releasable so that the dock board may be detached from the section 15 when not required.

The canopy means 21 includes a main canopy 40 for the main span 14 and a canopy section 41 for the extension section 15 of the bridge. The main canopy 40 comprises spaced bows 42 of metal tubing, or the like, having their lower ends removably secured to the trussing 23 of the span 14. Canvas, or the like, is stretched over and secured to the bows 42 to provide the desired protection against the elements. The outer end of the main canopy 40 is spaced a considerable distance rearwardly of the outer extremity of the main span 14. The bridge extension section 15 is provided with longitudinally extending hand rails 44 and the canopy section 41 includes spaced bows 45 which have their lower ends removably secured to the hand rails. Canvas, or the like, is secured on the bows 45 to complete the canopy section 41. The canopy section 41 is slightly lower than the main canopy 40 and is proportioned to freely telescope under the main canopy. With the bridge section 15 in its fully extended position, the canopy section 41 has a portion engaged within the main canopy 40 to maintain a seal and when the bridge section 15 is in the fully retracted position the canopy section 41 protrudes beyond the main canopy to cover and protect the outer portion of the bridge assembly. The person or operator controlling the bridge structure is stationed at the outer end of the main span 14 and transparent windows 47 are provided in the sides of the canopy section 41 to give full vision to the operator when the section 15 is retracted as just described. If desired, the side panels of the canopy may be rolled up to reduce the wind resistance and to give full visibility. It is to be understood that the canopies 40 and 41 may be detached from the bridge when not required and are such that they may be easily and quickly reinstalled when needed.

The inner cart or tower 16 is provided adjacent the dock 10 to support the inner end of the main bridge span 14 and in accordance with the invention, carries the end portion of the span for movement about both generally horizontal and vertical axes. Furthermore, the tower 16 is movable or translatable along the face of the dock 10 to permit positioning of the bridge at various stations or locations at the terminal structure. Where the dock 10 is of considerable height, as it will be in most instances, the tower 16 includes a base frame or chassis 48 and a tower structure 55 rising therefrom. Wheels 49 are provided on axles 50 carried by the chassis 48 to support the tower 16 for movement along the dock 10. The wheels 49 may be equipped with metal tires, solid rubber tires, or pneumatic tires, as desired. It is a feature of the invention that the tower 16 is power driven to travel parallel with the dock 10. In the particular case illustrated, the driving means is in the form of a reversible electric motor 51 on the chassis 48, it being apparent that mechanical means, hydraulic means, or a self-contained internal combustion engine may be employed to power the cart or tower 16. The motor 51 drives the axle of a pair of wheels 49 through the medium of a fluid drive 52 and appropriate speed reduction gearing 60. The energizing circuit and control for the motor 51 will be later described.

Figure 4:
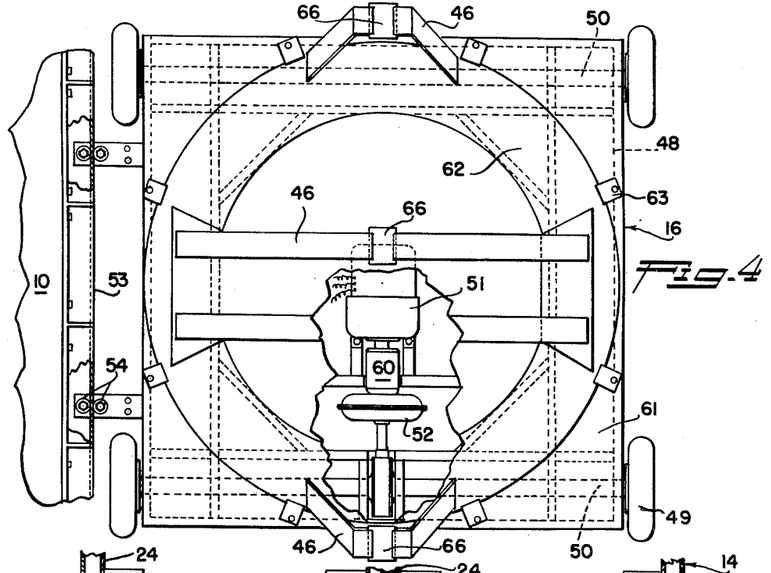
Figure 4 is an enlarged plan view of the inner tower of the bridge with a portion of the adjacent dock showing the guide means associated therewith.
Figure 5:
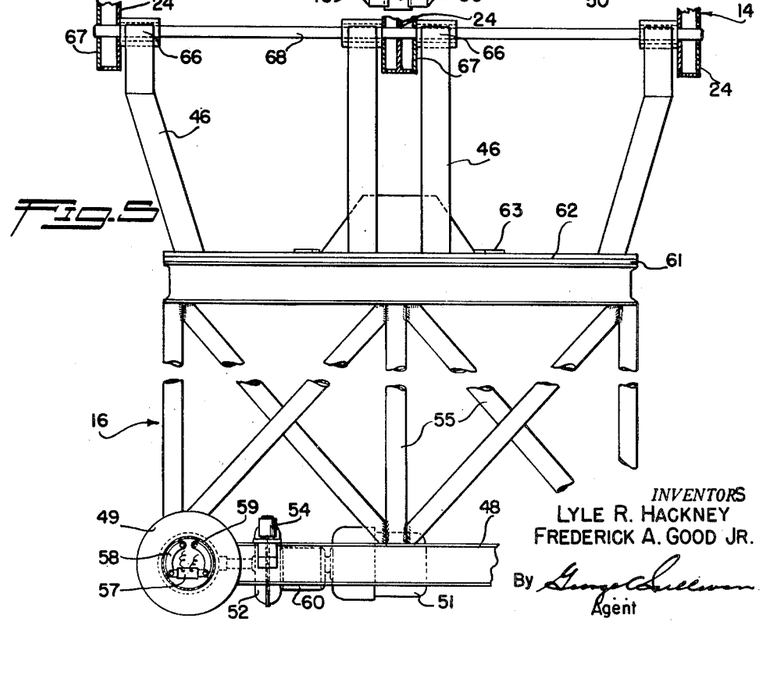
Figure 5 is an enlarged fragmentary side elevation of the inner tower with a portion of the main bridge span and a brake appearing in vertical cross section.
Figure 13:
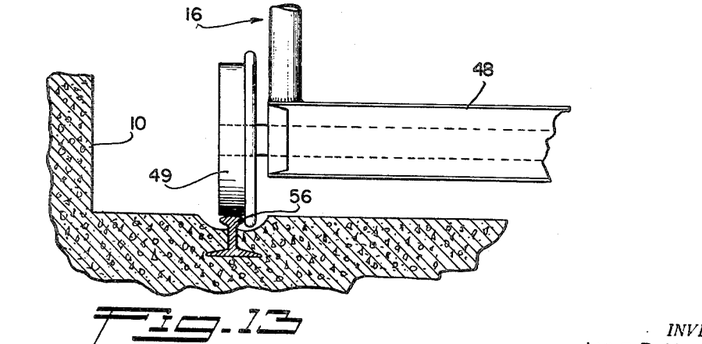
Figure 13 is an enlarged fragmentary vertical sectional view illustrating one means for guiding the inner tower.

It is preferred to guide the inner tower 16 to move parallel with the dock 10. In Figures 2, 4 and 14 the guide means for the tower 16 includes a rail 53 secured to the dock 10 and spaced rollers 54 are provided on the tower structure 55 for cooperating with the inner and outer surfaces of the rail to maintain the tower in positions parallel with the dock. In Figure 13 the wheels 49 of the tower 16 are flanged and ride upon or cooperate with rails 56 at the ground or field level. It will be seen that with either of these arrangements the inner tower 16 of the bridge assembly is guided to move parallel with the base of the dock 10. Brakes are associated with the wheels 49, or certain of them, to hold the tower 16 and the inner end of the bridge span 14 against movement or translation when the span is to be swung about the vertical axis and to hold the tower 16 against movement at other times as required. Any appropriate type of brake means may be employed. In the drawings we have shown brake means including a solenoid actuator 57 for actuating shoes 58 into braking cooperation with drums 59 associated with the wheels 49. The circuit for controlling the brakes will be hereinafter described.

The tower structure 55 is rigid with the base frame or chassis 48 and is provided at its upper end with a horizontal plate 61. An annular plate 62 rides or bears on the upper surface of the plate 61 for movement about a generally vertical axis. Brackets 63 are secured to the stationary plate 61 and carry rotatable rollers 64 for cooperating with the periphery of the turnable plate 62 and also carry rotatable rollers 65 engageable by the upper surface of the plate 62. The rollers 64 and 65 of the circumferentially spaced brackets 63 guide and retain the plate 62 for free angular movement. Spaced pairs of struts 46 extend upwardly from the turnable plate 62 and the struts of each pair converge to bushed bearings 66. The spaced bearings 66 are horizontally aligned. As illustrated in the drawings, the bearings 66 are spaced and related to be adjacent the longitudinal beams 24 of the bridge span 14 and the beams are provided with blocks or boxes 67 aligned with the bearings. A shaft 68 is carried in the boxes 67 and is received in the bearings 66 to secure the inner end of the span 14 for movement about a generally horizontal axis. From the foregoing it will be seen that the main bridge span 14 may be swung about the axis of movement of the plate 62 to assume various angular positions relative to the dock 10 and may be pivoted or raised and lowered about the axis of the shaft 68 to various inclined positions relative to the dock 10 and, of course, may be brought to a horizontal position to have its decking 22 in substantially the same horizontal plane as the upper surface of the dock.

The outer cart or tower 17 carries the outer end portion of the main span 14 and is capable of movement to swing the bridge to various angular positions relative to the dock 10 and to permit movement of the bridge to any selected position or station along the dock. The outer tower 17 includes a base frame 69 provided with a pair of inner and outer wheels 18 and two end wheels 19. The wheels 18 and 19 may be equipped with any selected or required type of tires. The wheels 18 are power driven and any selected form of power means and drive mechanism may be employed to drive them. In the case illustrated, a reversible electric motor 70 of proper rating is mounted in the frame 69 and drives the axles 71 of the wheels 18 through a speed reduction unit 72 and a fluid drive unit 73. Brakes 74, similar to the brake means of the inner tower 16, are associated with the wheels 18 to hold the tower 17 against movement when desired.

Figure 1:
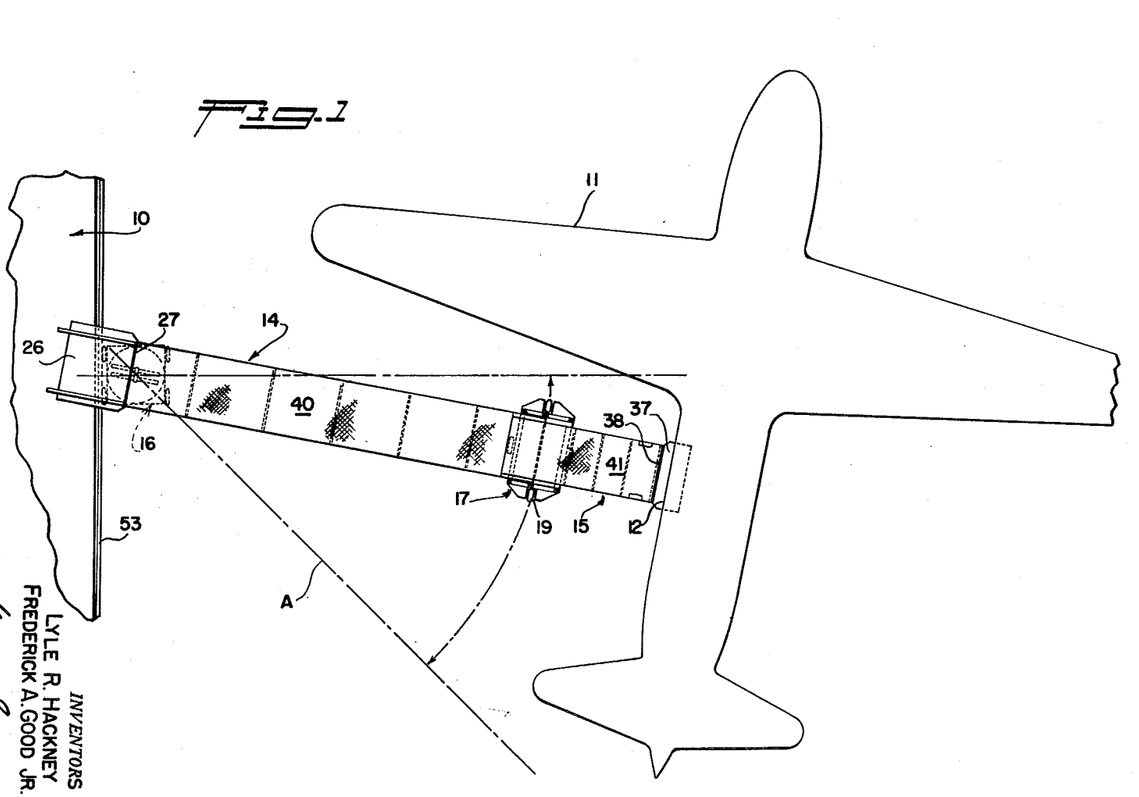
Figure 1 is a plan view of the bridge structure of the invention showing it extending between a dock and a typical airplane.
Figures 6, 7, 8:
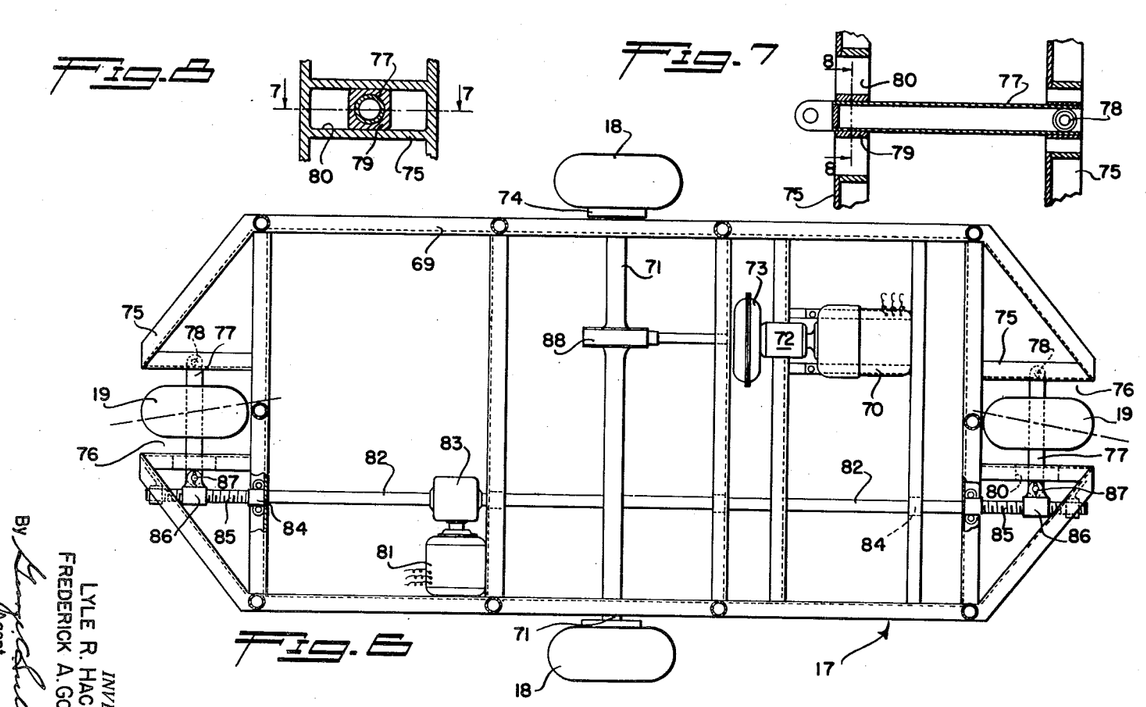
Figure 6 is an enlarged plan view of the chassis and associated mechanisms of the outer tower.
Figure 7 is an enlarged fragmentary horizontal sectional view taken substantially as indicated by line 7—7 on Figure 8 illustrating the mounting means for one of the steerable wheels of the outer tower.
Figure 8 is a fragmentary vertical sectional view taken as indicated by line 8—8 on Figure 7.
Figure 9:
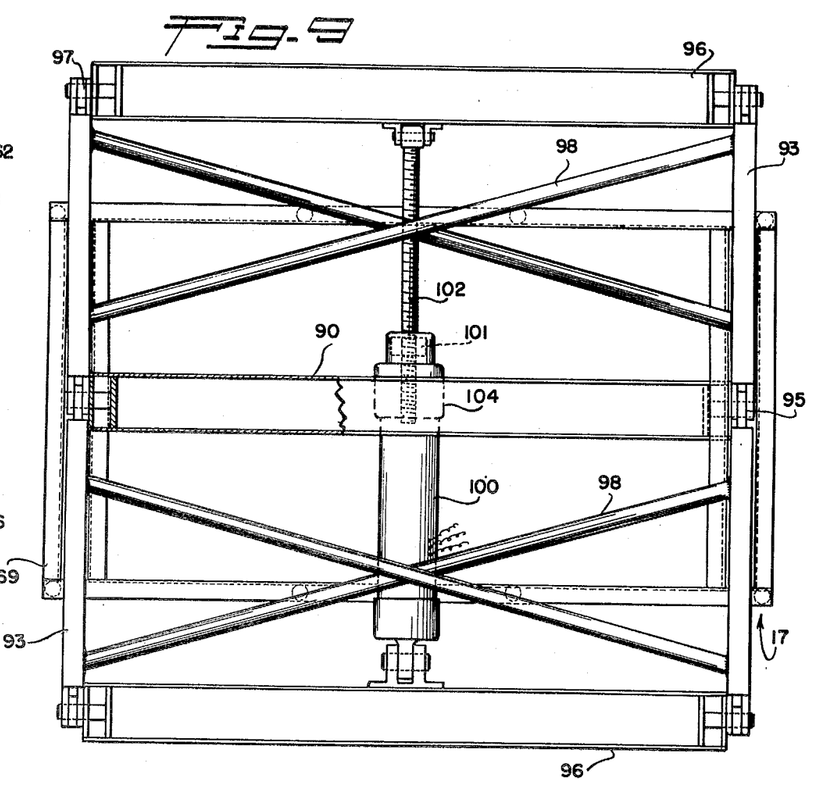
Figure 9 is an enlarged plan view of the outer tower assembly with a portion appearing in horizontal cross section and illustrating the jack means for elevating the bridge.
Figure 10:
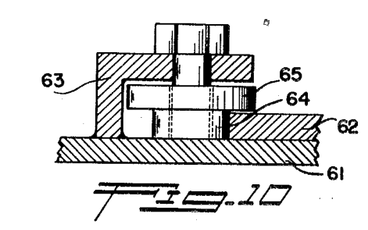
Figure 10 is an enlarged fragmentary vertical sectional view illustrating a pair of guide rollers for the horizontal pivot plate of the inner tower.

The wheels 19 are arranged at the opposite ends of the tower base 69 and the base is constructed and proportioned so that its ends project laterally beyond the opposite sides of the span 14 at the outer end of the span, as shown in Figure 1. Accordingly, the wheels 19 are spaced at the opposite sides of the bridge and are aligned one with the other. In accordance with the invention, the wheels 19 are steerable to assist in directing the bridge as it is swung about the vertical axis of the plate 62 and to allow the bridge to move along the dock in any angular relation to the dock. We have shown the base frame 69 provided with end members 75 constructed to leave wells 76 for the wheels 19. The shafts or axles 77 for the wheels 19 extend through these wells 76 and carry the wheels for free rotation. One end of each axle 77 is hinged or pivoted at 78 to the members 75 and the opposite ends of the shafts carry blocks 79 which slide in horizontal slots 80 in the members, as illustrated in Figures 7 and 8. When the bridge is to be moved about the vertical axis at the inner tower 16, that is about the axis of rotation of the plate 62, it is desirable to direct or position the wheels 19 so that their central vertical planes are tangent to an arc concentrate with said axis, the wheels being toed in or inwardly convergent relative to the longitudinal axis of the span 14. On the other hand, when the bridge is to be translated along the dock 10, the wheels 19 may take any selected form. In the simple case illustrated, a reversible electric motor 81 is mounted on the frame 69 and drives a shaft 82 through a direction changing and speed reducing gear box 83. The shaft 82 is supported by suitable spaced bearings 84 on the frame 69 and is provided adjacent its ends with worms or screwthreads 85. The threads 85 are of opposite hand, that is one thread is a right-hand thread and the other thread is pitched in the left-hand direction. Nuts 86 are secured on the swingable ends of the axles 77 by pin and slot connections 87 and are internally threaded to receive and mate with the threads 85 of the shaft 82. It will be seen that operation of the motor 81 will pivot or steer the wheels 19 about the points 78 to provide for the intended or desired directing of the outer bridge tower 17. The energizing and control system for the motor 81 will be subsequently described. Where the wheels 19 are steerable, as just described, it is desirable to incorporate a differential mechanism 88 in the axle unit 71 of the side wheels 18.

The outer tower 17 further includes a tower structure 89 rising from the wheel base frame 69 and a jack mechanism or elevating mechanism arranged between the tower structure and the main bridge span 14. The outer end of the span 14 carries at its under side a transverse beam 90, or the like, and the upper end of the tower structure 89 is provided with a similar beam 91. The above mentioned jack is connected between these beams 90 and 91 and includes two pairs of links 92 and 93. The lower links 92 are pivotally secured to the tower beam 91 at 94 and the upper links 93 are pivoted to the beam 90 of the span 14 at 95. The outer ends of the upper and lower links 93 and 92 are pivoted together and to two connecting beams 96 at the points 97. The pairs of transversely aligned lower links 92 and upper links 93 are connected and reinforced by diagonal bracing 98. It will be seen that the jack comprises two sets of connected links 92 and 93 arranged in the form of a parallelogram.

The means for operating the jack of the outer tower 17 may be mechanical, hydraulic, or electrical. In the particular case illustrated in the drawings, an electrically operated worm or screw thread operating means is provided which includes a reversible electric motor 100 driving a rotatable nut 101 through the medium of a speed reducing gear box 104. The motor 100 is suitably secured to one of the connecting beams 96 of the jack assembly and a screw 102 is secured to the opposite beam 96 to extend through and mate with the nut 101. It will be seen that upon rotation of the nut 101 in one direction the screw 102 is fed into the nut to cause the beams 96 to move toward one another so that the links 92 and 93 raise the bridge span 14 about its pivotal axis at the shaft 68 and upon rotation of the nut 101 in the other direction the beams 96 are moved apart and the links 92 and 93 are pivoted to lower the span 14. It is to be observed that the screw thread or worm means for operating the jack is positive and locks or retains the bridge span 14 in any selected raised or lowered position until again actuated to alter the inclination or position of the span. The jack means of the tower 17 allows the main span 14 to be adjusted vertically to bring the extension section 15 to the height of the passenger or freight doors of airplanes of different types and models so that the dock board 37 may be properly positioned at the door sills. The circuit for operating and controlling the jack motor 100 will be subsequently described.

The invention preferably provides a power energized means for extending and retracting the bridge extension section 15. This means includes a reversible electric motor 106 mounted at the underside of the main span 14 adjacent its outer end to drive a spool 107. A pair of cables 108 is wound on the spool 107 and the cables extend inwardly or rearwardly to have their ends anchored to the underside of the main span 14, a considerable distance from its outer end. The cables 108 are spaced at the opposite side of the slot 32 and the central beams 29 and are guided or directed by pulleys or idler spools 109. A third cable 110 is wound on the spool 107 and extends outwardly therefrom over a guide spool 130 to have its outer end secured to the outer end portion of the bridge extension section 15. It will be seen that upon rotation of the spool 107 in one direction the cables 108 are wound on the spool and the cable 110 is paid out so that the section 15 is projected or moved outwardly and upon rotation of the spool 107 in the other direction the cable 110 is wound on the spool to retract the section 15 while the cables 108 are being paid out.

Figure 17:
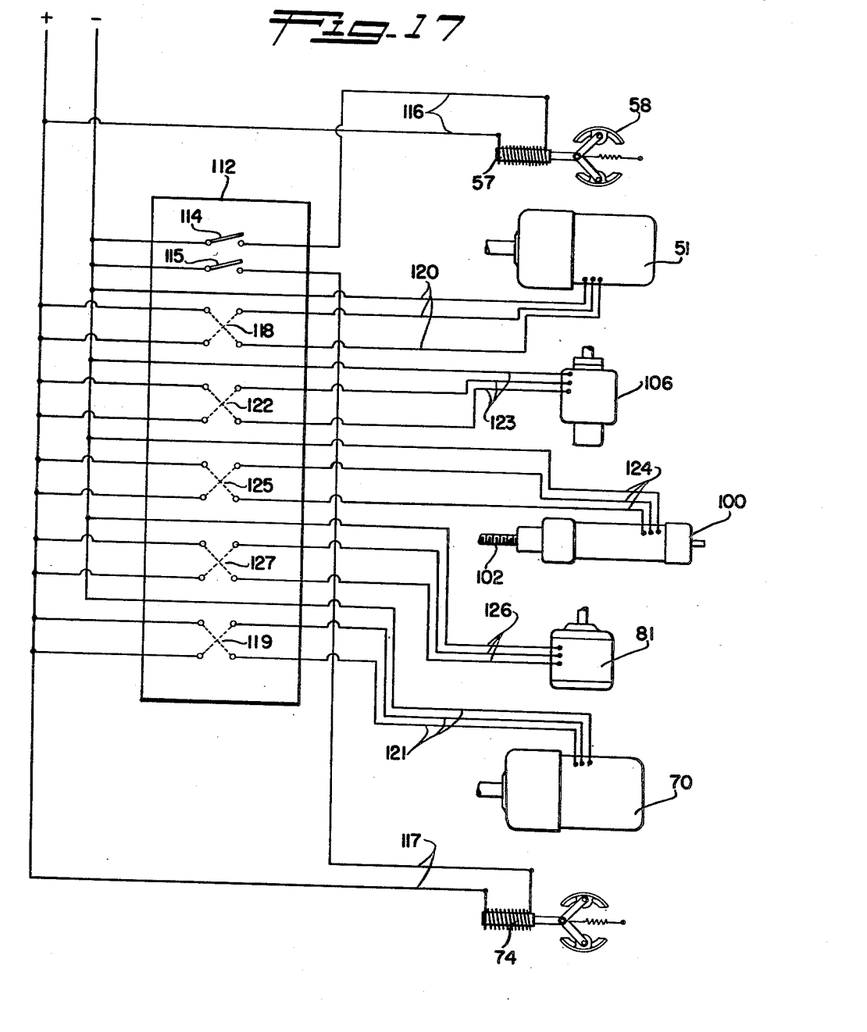
Figure 17 is a wiring diagram illustrating the circuits for operating the various instrumentalities of the bridge structure.

It is preferred to control the various instrumentalities of the bridge structure from a central station or location and we prefer to have this station at the outer end of the main bridge span 14 so that the operator may most effectively determine and judge the clearance of the bridge with the airplanes, etc. Accordingly, we have shown a control panel 112 mounted in the outer end portion of the main span 14. The circuits for controlling and operating the various mechanisms of the bridge are controllable from the panel 112. It will be apparent that any selected or required system of control circuits may be employed and that the structure may include appropriate lighting means, telephone circuits, etc. also controlled from the panel 112. As diagrammatically illustrated in Figure 17, the manually operable switches for the control of the several power actuated mechanisms are located at the panel 112. Thus the switches 114 and 115 for controlling the energizing circuits 116 and 117 of the solenoid brake means 57 and 74, respectively, of the inner and outer towers 16 and 17 are at the panel 112. The reversing switches 118 and 119 for the energizing circuits 120 and 121 of the actuating or driving motors 51 and 70 respectively of the inner and outer towers 16 and 17 are also provided at the panel 112. The reversible motor 106 for extending and retracting the bridge section 15 is controlled by a reversing switch 122 arranged at the panel 112 and connected in the operating circuit 123 of the motor. The reversible motor 100 for elevating and lowering the span 14 has a circuit 124 controlled by a switch 125 accessible at the control panel 112 and the energizing circuit 126 for the steering motor 81 has a reversing switch 127 also accessible at the panel 112.

From the foregoing detailed description it will be seen that we have provided a practical, effective loading and unloading bridge structure suitable for use with aircraft, trucks, and other vehicles and operable to materially expedite the loading and unloading of aircraft passengers, freight, commissary materials, and the like, at air terminals, etc. The entire bridge is readily moved along the dock 10 from one station to another or to any required location by operation of the motors 51 and 70 of the inner and outer towers 16 and 17. The bridge may preferably be moved along the dock 10 with the span 14 in a position generally parallel with and therefore adjacent the face of the dock although the bridge may be translated along the dock with the span 14 in any angular position relative to the dock. Assuming that the inner tower 16 is positioned at a selected station along the dock 10, the span 14 may be swung to a position as indicated by the broken line A in Figure 1 by operating the switch 119 to move the outer tower 17 while the inner tower 16 remains stationary. Prior to such an operation, the motor 81 is preferably operated to bring the wheels 19 of the outer tower 17 to the above described toed in positions so that the tower 17 readily travels in an arc concentric with the axis of the turning plate 62 and the brake means 57 of the inner tower preferably remains set or actuated while the span 14 is being swung. With the span 14 in the position of line A, and preferably lowered, the airplane may be taxied or spotted in a position such as indicated in Figure 1. The motor 70 may then be operated to swing the bridge span 14 to the full line position of Figure 1. During this operation the extension section 15 is retracted so as to clear the empennage of the airplane and if the canopies 40 and 41 are in place or in use, the operator has a clear view of the operation through the open end of the bridge structure and through the windows 47. The motor 106 may be energized to extend the section 15 and the jack motor 100 may be energized by operating the switch 125 to raise the span 14 and section 15 to bring the outer end of the section 15 to the doorway 12 of the airplane. It will be seen that by appropriate swinging of the span 14 about the axis of the plate 62, raising or lowering of the span 14 about the pivot shaft 68 and the extension or retraction of the section 15, the bridge structure may be brought to the position where passengers, freight, etc. may be expeditiously loaded and unloaded. The dock boards 26 and 37 are adapted to be arranged in place to extend across the gaps at the inner and outer ends of the bridge so that wheeled conveyances may be readily moved between the dock 10 and the interior of the airplane. Following the loading and/or unloading operation the section 15 may be retracted, the span 14 may be lowered, if desired, and the bridge span 14 may either remain in place or may be swung inwardly toward the dock 10 or moved along the dock to a new location. The bridge structure is very flexible in its operation and is, therefore, capable of use in the loading and unloading of aircraft of different types and models, taxied to appropriate positions adjacent the dock 10. The variout elements of the bridge structure are conveniently controlled by the one operator stationed at the control panel 112.

Having described only typical forms of the invention we do not wish to be limited to the specific details herein set forth, but wish to reserve to ourselves any variations or modifications that may appear to those skilled in the art and fall within the scope of the following claims.

We claim:

1. In combination, an aircraft loading and unloading bridge and dock, a loading and unloading main span extending outwardly from the dock, a first power driven mobile unit adjacent said dock, a horizontal pivot connecting one end of said main span with said first mobile unit, a vertical pivot means on said first mobile unit supporting said main span for rotary movement about a vertical axis, other means connecting said first unit to said dock guiding the unit for movement along said dock including a track paralleling the dock and connected thereto and wheels on said first mobile unit cooperating with said track, a second power driven mobile unit, a second horizontal pivot connecting the other end of said main span with said second mobile unit, power driven jack means on said second unit to provide for the raising and lowering of the said other end of the span, said second unit having power driven steering means for guiding the said other end of said main span about the vertical axis, a power driven secondary span supported by and extensible from said main span, power brakes on said mobile units, and central control means for operating the various power means for raising and lowering, extending and retracting and propelling and braking said aircraft unloading and loading bridge.

2. In combination, an aircraft loading and unloading dock, an elongate longitudinally extensible and contractible aircraft loading and unloading bridge, a first wheeled mobile unit adjacent said dock, a horizontal pivot connecting one end of said bridge with said first mobile unit, a vertical pivot means on said first mobile unit supporting said one end of the bridge for rotary movement about a vertical axis, other means connecting said first unit to said dock guiding the unit for movement along said dock including a track paralleling the dock and connected thereto and wheels on said first mobile unit cooperating with said track, a second mobile unit, a second horizontal pivot connecting the other end of said bridge with said second mobile unit, said second mobile unit having power means for propelling and extending and contracting said bridge, power driven means on said second mobile unit for raising and lowering the said other end of said bridge, said second unit having power driven steering means for guiding the said one end of said bridge about the vertical axis, braking means on said second unit, and central control means for operating the various power means for raising and lowering, propelling and steering, and extending and contracting said aircraft loading and unloading bridge.

References Cited in the file of this patent

UNITED STATES PATENTS

| Number | Name | Date |
|---|---|---|
| 510,471 | Cram | Dec. 12, 1893 |
| 849,222 | Fleming | Apr. 2, 1907 |
| 1,106,074 | Bidlake | Aug. 4, 1914 |
| 1,232,437 | Simpson | July 3, 1917 |
| 1,592,770 | Liberman | July 13, 1926 |
| 1,593,999 | Bingham et al. | July 27, 1927 |
| 2,470,337 | Campbell | May 17, 1949 |
| 2,498,819 | Noville | Feb. 28, 1950 |
| 2,524,454 | Luther, Jr. | Oct. 3, 1950 |

FOREIGN PATENTS

| Number | Country | Date |
|---|---|---|
| 111,065 | Austria | of 1928 |
| 528,371 | Germany | of 1931 |
| 353,257 | Great Britain | July 23, 1931 |